Sept. 6, 1966   R. G. WILLING   3,271,723
CONDUCTIVE BALL BEARING
Filed May 4, 1964
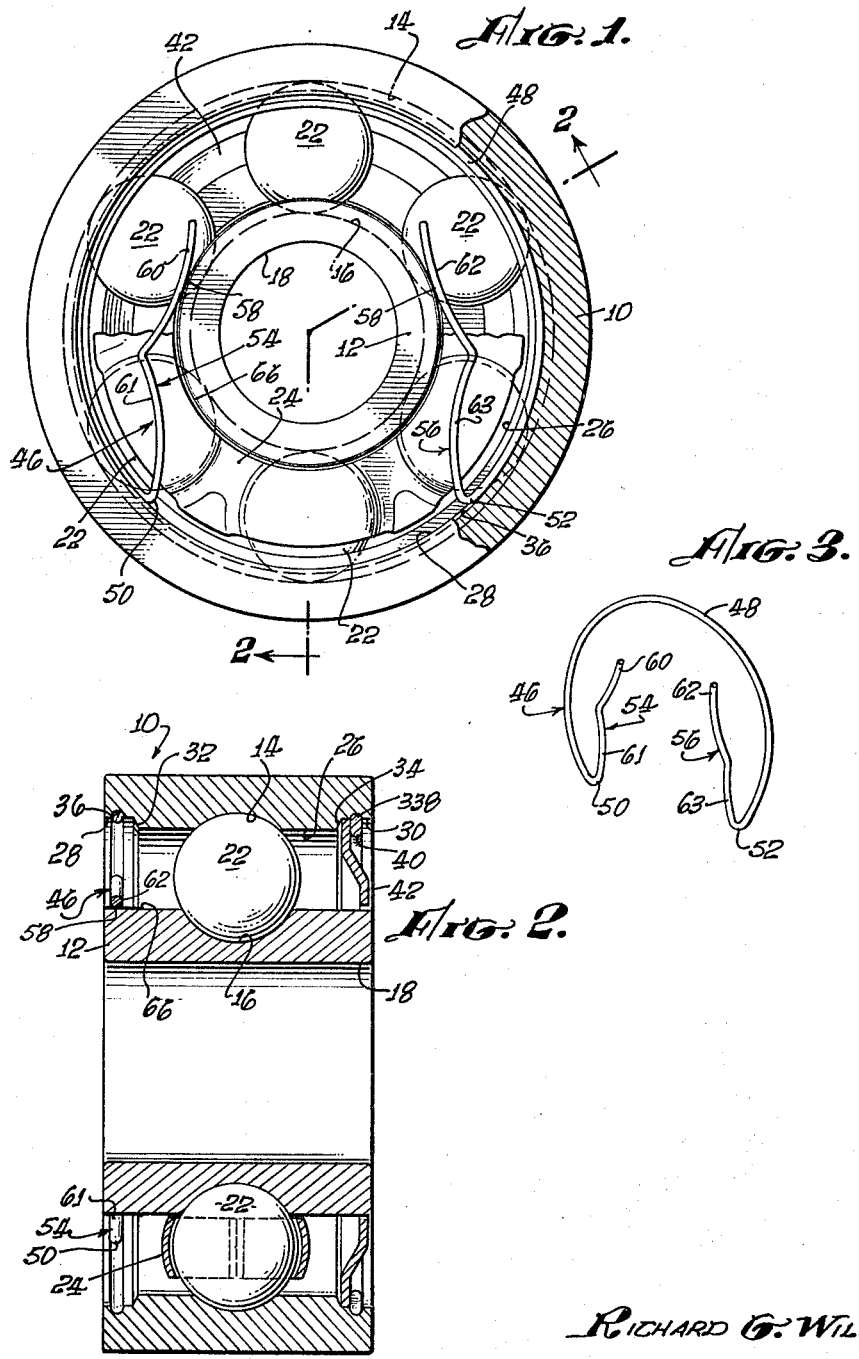
RICHARD G. WILLING,
INVENTOR.
BY
Fulwider, Patton, Rieber, Lee & Utecht,
ATTORNEYS.

United States Patent Office 3,271,723
Patented Sept. 6, 1966

3,271,723
CONDUCTIVE BALL BEARING
Richard G. Willing, Los Angeles, Calif., assignor to Federal-Mogul-Bower Bearings, Inc., Detroit, Mich., a corporation of Michigan
Filed May 4, 1964, Ser. No. 364,682
10 Claims. (Cl. 339—5)

This invention relates to electrically conductive bearings for rotatable machine elements, and more particularly, relates to antifriction bearings incorporating improved means for providing an electrically conductive path in shunt to the bearing ball or roller elements thereof between the inner and outer race members.

This invention finds its most important application to miniature precision-type ball bearings for low load, low friction, high-speed applications. It has been found desirable and sometimes necessary in connection with certain apparatus, many of which employ the hereinbefore mentioned types of antifriction bearings, to provide an electrically conductive path across or in shunt to the antifriction bearings therein to enable certain moving elements supported by the bearings to be supplied with required electrical currents or signals. It has also been found equally important that the means for providing such electrically conductive path not require any space in addition to that normally occupied by the bearings, and this requirement precludes the use of brush and collector ring apparatus and the like other complicated and bulky types of devices heretofore employed for such purposes. These latter requirements are particularly important in connection with currently prevalent designs of extremely compact mechanisms and instruments in which miniaturized components are used. It is also important in connection with such instruments that the conductivity across the bearings while running be extremely constant and free from intermittent variations. This latter qualification has heretofore been difficult to attain, particularly under the high-speed operating conditions under which such miniature-type bearings are often required to operate.

It has also been found that antifriction bearings, particularly ball bearings, are detrimentally affected by the passage of an electric current between the rolling surfaces of contact of the bearing balls and races, however minute such current may be. Such detrimental effect is apparently caused by the occurrence of minute arcing or sparking which occurs between the rolling surfaces of contact, and through the film of lubricant usually present, which results in a progressive roughening of the bearing surfaces and consequent deterioration of the bearing. Provision of a suitable electrical shunt across the bearing between the races has thus been found to prolong the useful life of the bearings.

It is, accordingly, an object of this invention to provide an improved electrically conductive antifriction bearing.

It is another object of this invention to provide an electrically conductive antifriction bearing having improved running life and durability.

It is another object of this invention to provide an antifriction bearing electrical shunting device requiring no space in addition to that normally occupied by the conventional bearing assembly.

It is still another object of this invention to provide an antifriction bearing electrical shunting device, particularly suitable for high-speed miniature bearings.

It is a further object of this invention to provide an electrically conductive antifriction bearing having a substantially constant electrical conductivity while running.

It is a still further object of this invention to provide an electrically conductive antifriction bearing having a minimum of additional running friction over that of conventional bearings of the same design.

The objects of this invention are accomplished, in general, by means of a novel snap-ring type electrically conductive shunt member, adapted to be retained in the annular groove normally provided in the inner surface of the outer race ring of the bearing, and having an inwardly extending portion which makes sliding electrical contact with a portion of the outer surface of the inner race ring of the bearing.

An important advantage of this invention resides in its adaptability to use in most conventional ball and roller bearings assemblies without requiring any additional space or any modification of such assemblies.

These and other objects and advantages and features of novelty will be evident hereinafter.

In order to illustrate one presently preferred embodiment of the invention and the manner of its use, attention is directed to the accompanying drawings in which:

FIGURE 1 is an enlarged end elevational view of a typical bearing assembly embodying the present invention;

FIGURE 2 is a longitudinal sectional view taken on line 2—2 of FIGURE 1; and

FIGURE 3 is a separate, detailed, perspective view of the electrical shunt member employed in the assembly shown in FIGURES 1 and 2.

Referring first primarily to FIGURES 1 and 2, the assembly of the typical bearing shown comprises concentric, outer and inner bearing race rings 10 and 11 respectively, the outer race ring 10 having formed on the inner cylindrical surface thereof and outer bearing ball raceway groove 14 and the inner race ring 12 having formed on the outer cylindrical surface thereof an opposite inner bearing ball raceway groove 16, the inner bearing race ring 12 being provided with a concentric bore 18 adapted to receive a shaft to be rotatably supported by the bearing.

Equally, peripherally spaced-apart in the bearing assembly and retained between the inner and outer bearing ball raceway grooves 14 and 16 of the race rings 10 and 12 respectively is a complement of bearing balls as shown at 22. These bearing balls are maintained equally circumferentially spaced-apart in the raceways by means of an intermediate, generally annular snap retainer 24, the exact form and construction of which does not form an important feature of this invention but which may be of any suitable or conventional design.

The inner and outer race rings 10 and 12 and also the bearing balls 22 may be composed of various suitable metals, such as, for example, chrome alloy steel, stainless steel, and beryllium copper, of which stainless steel has been found preferable in many applications, particularly in the high-speed miniature bearing categories.

Formed adjacent the opposite ends of the bore 26 of the outer race ring 10 are a pair of counter bores 28 and 30 forming at the junctures thereof axially outwardly facing shoulders 32 and 34 respectively, and in turn formed in the counter bores 28 and 30 are a pair of inwardly facing annular grooves 36 and 38. The annular grooves 36 and 38, in the conventional arrangement of ball bearing assemblies, usually serve to contain resilient, split snap rings, such as that shown in section at 40, which serves to retain between it and the adjacent shoulder, such as that shown at 34, an annular bearing shield 42.

In the assembly of the apparatus of the present invention, one or both of the annular snap ring grooves, such as that shown at 36, is utilized for detachably retaining a conductive, bearing shunt member shown generally at 46. The shunt member 46 may be formed of spring wire stock, preferably although not necessarily cylindrical in cross section, and composed of one of a number of suitable spring materials, such as, for example, stainless steel, or beryllium copper. The shunt member 46 is formed with a circumferentially open, generally arcuate, U-shaped portion, 48 as best shown in FIGURE 3, having a free maximum diameter substantially greater than the inside diameter of the snap ring groove 36, and having opposite end portions thereof sharply bent inwardly upon itself at 50 and 52 to form a pair of inwardly extending arms 54 and 56 lying in a common plane with the arcuate portion. The arms 54 and 56 are each formed with a pair of slightly inwardly curved end portions 60, 61, and 62, 63, such that when the arcuate portion 48 of the shunt member 46 is diametrially compressed within the snap ring groove 36, the sides of the innermost curved portions 60 and 62, of the arms make sliding contact with the outer cylindrical surface of the inner race ring 18 adjacent an axial end thereof, as shown at 58. The formation of the contact arms 54 and 56 of the shunt member 46 with the adjacent curved portions 60, 61, 62 and 63 respectively, permits these arms to have sufficient effective length to have substantial resiliency in bending and, at the same time, permit the contact portions 60 and 62 thereof to make relatively light, tangential, sliding engagement with opposite sides of the outer cylindrical surface of the race ring 18 as before mentioned.

The outer, cylindrical surface of the portion of the race ring 18 upon which the arm portions 60 and 62 of the shunt member 46 make sliding contact, as hereinbefore described, is preferably plated with a layer of gold or silver, such layer being illustrated in exaggerated thickness at 66 in FIGURE 2. It has been found that the provision of such layer of gold or silver upon which the contact arms 54 and 56 of the shunt member 46 make sliding engagement during operation of the bearing, results in reduced wear of the mutually containing surfaces of the arms of shunt member 46 and race ring 12, and also results in substantially greater constancy and freedom from intermittent variations, in the electrical conductivity therebetween under running conditions.

The foregoing is illustrative of a preferred embodiment of the invention and is not to be considered as limiting. Variations therein may be made by those skilled in the art, and the invention is to include any such variations and any apparatus which accomplishes the objects of this invention within the scope of the appended claims.

What is claimed is:

1. In an electrically conductive bearing having inner and outer bearing race members rotatably supported coaxially of one another by an intermediate complement of rolling bearing members, apparatus comprising:
 a radially facing, annular groove formed in one of said bearing race members;
 a resilient, arcuate, electrically conductive member retainingly engaged in said annular groove,
 and said conductive member having an integrally formed, transversely extending arm positioned in sliding contact with the adjacent surface of the other of said bearing race members.

2. In an electrically conductive bearing having inner and outer bearing race members rotatably supported coaxially of one another by an intermediate complement of rolling bearing members, apparatus comprising:
 an annular groove formed in one of said race members, facing radially toward the other of said race members;
 a resilient, arcuate, electrically conductive member retainingly engaged in said annular groove;
 said conductive member having an integrally formed, transversely extending arm positioned in sliding electrical contact with the adjacent surface portion of the other of said bearing race members;
 and said adjacent surface portion having thereon an attached layer of metal chosen from the group of metals consisting of gold and silver.

3. In an electrically conductive bearing having inner and outer bearing race members rotatably suported coaxially of one another by an intermediate complement of rolling bearing members, apparatus comprising:
 a radially facing, annular groove formed in one of said bearing race members;
 a resilient, arcuate, electrically conductive member retainingly engaged in said annular groove,
 and said conductive member having an integrally formed, transversely extending resilient arm positioned in sliding contact with the adjacent surface of the other of said bearing race members.

4. In an electrically conductive bearing having inner and outer bearing race members rotatably supported coaxially of one another by an intermediate complement of rolling bearing members, apparatus comprising:
 a radially inwardly facing, annular groove formed in the inner surface of the outer race member;
 a resilient, arcuate, electrically conductive member retainingly engaged in said annular groove,
 and said conductive member having an integrally formed, transversely inwardly extending arm positioned in sliding contact with the adjacent outer surface of the said inner race member.

5. In an electrically conductive bearing having inner and outer bearing race rings having outer and inner cylindrical surfaces respectively, rotatably supported coaxially of one another by an intermediate complement of rolling bearing members, apparatus comprising:
 a radially inwardly facing, annular groove formed around the inner cylindrical surface of said outer race ring;
 a resilient, arcuate, electrically conductive member detachably retainingly engaged in said annular groove,
 and said conductive member having an integrally formed, transversely inwardly extending arm, resiliently biased into sliding contact with the adjacent outer cylindrical surface of the said inner race ring.

6. In an electrically conductive bearing having inner and outer bearing races having outer and inner generally cylindrical surfaces respectively, said races being rotatably supported coaxially of one another by an intermediate complement of rolling bearing members, apparatus comprising:
 a radially inwardly facing, annular groove formed around the inner cylindrical surface of the outer race;
 a resilient, arcuate, electrically conductive member detachably retainingly engaged in said annular groove,
 and said conductive member having a pair of integrally formed, transversely inwardly extending arms, positioned such as to be resiliently biased in sliding contact with opposite sides of the outer cylindrical surface of the inner race.

7. In an electrically conductive bearing having inner and outer bearing race members formed with outwardly and inwardly facing, generally cylindrical, surfaces respectively, said race members being rotatably supported coaxially of one another by an intermediate complement of rolling bearing members, electrically conductive shunt apparatus therefor comprising:
 a radially inwardly facing, annular groove formed around the inner cylindrical surface of the outer one of said bearing race members;
 and a resilient, electrically conductive wire member having an arcuate portion resiliently biased in detachable retaining engagement with said annular groove,
 said conductive member having an integrally formed wire arm, extending generally radially inwardly from each end of said arcuate portion, and resiliently biased in sliding electrical contact with opposite adjacent sides of the outer cylindrical surface of the inner one of said race members.

8. In an electrically conductive bearing having inner and outer bearing race members formed with outwardly and inwardly facing, generally cylindrical, surfaces respectively, said race members being rotatably supported coaxially of one another by an intermediate complement of rolling bearing members, electrically conductive shunt apparatus therefor comprising:

a radially inwardly facing, annular groove formed around the inner cylindrical surface of the outer one of said bearing race members;

and a resilient, electrically conductive, generally U-shaped wire member having an arcuate portion resiliently biased in detachable retaining engagement with said annular groove, said conductive member having a pair of integrally formed wire arms, said arms being formed by lending opposite end portions of said arcuate portion back inwardly upon itself at an acute angle, such that said arms extend inwardly of said arcuate portion, substantially parallel with one another and in a common plane with said arcuate portion, said arms thereby being positioned for resiliently biased sliding electrical contact with opposite adjacent sides of the outer cylindrical surface of the inner one of said race members.

9. An electrically conductive shunt for a bearing having inner and outer bearing race members having outwardly and inwardly facing, generally cylindrical surfaces respectively, said race members being separated and rotatably supported coaxially of one another by an intermediate complement of rolling bearing members, and the outer one of said bearing race members having a radially inwardly facing, annular groove formed around the inner cylindrical surface thereof, comprising:

a resilient, electrically conductive, generally U-shaped wire member having an intermediate arcuate portion, resiliently biased for detachable retaining engagement within said annular groove, and a pair of integrally formed substantially parallel wire arms, extending inwardly from each end of and lying in a common plane with said arcuate portion, for sliding electrical contact with opposite adjacent sides of the outer cylindrical surface of the inner one of said race members.

10. An electrically conductive shunt for a bearing having inner and outer bearing race members having outwardly and inwardly facing, generally cylindrical surfaces respectively, said race members being separated and rotatably supported coaxially of one another by an intermeditae complement of rolling bearing members, and the outer one of said bearing race members having a radially inwardly facing, annular groove formed around the inner cylindrical surface thereof, comprising:

a resilient, electrically conductive, generally U-shaped wire member having an intermediate arcuate portion, resiliently biased for detachable retaining engagement within said annular groove, and a pair of integrally formed substantially parallel wire arms, formed of opposite end extensions of said arcuate portion bent back inwardly at an acute angle relative to the adjacent end portions of said arcuate portion, and lying in a common plane with said arcuate portion, for sliding electrical contact with opposite adjacent sides of the outer cylindrical surface of the inner one of said race members.

References Cited by the Examiner

UNITED STATES PATENTS 3,089,112   5/1963   Seaquist _____ 339—5

FRANK SUSKO, *Primary Examiner.*